US008676986B2

(12) United States Patent
Harper et al.

(10) Patent No.: US 8,676,986 B2
(45) Date of Patent: Mar. 18, 2014

(54) REDUCED DATA SESSION ESTABLISHMENT TIME IN CDMA-2000 NETWORKS

(75) Inventors: Mathew Hayden Harper, Salem, NH (US); Sanil Puthiyandyil, Nashua, NH (US); Janakiraman Senthilnathan, Chelmsford, MA (US)

(73) Assignee: Cisco Technology, Inc., San Jose, CA (US)

( * ) Notice: Subject to any disclaimer, the term of this patent is extended or adjusted under 35 U.S.C. 154(b) by 2341 days.

(21) Appl. No.: 10/797,646

(22) Filed: Mar. 10, 2004

(65) Prior Publication Data

US 2005/0204043 A1    Sep. 15, 2005

(51) Int. Cl.
*G06F 15/16*    (2006.01)
*H04W 4/00*    (2009.01)

(52) U.S. Cl.
USPC ........................................ 709/227; 455/435.1

(58) Field of Classification Search
USPC .......................................................... 709/227
See application file for complete search history.

(56) References Cited

U.S. PATENT DOCUMENTS

| 6,005,852 | A | * | 12/1999 | Kokko et al. | 370/329 |
| 6,076,181 | A | * | 6/2000 | Cheng | 714/748 |
| 6,421,718 | B1 | * | 7/2002 | Lamkin et al. | 709/223 |
| 6,487,218 | B1 | * | 11/2002 | Ludwig et al. | 370/469 |
| 6,791,945 | B1 | * | 9/2004 | Levenson et al. | 370/235 |
| 6,810,263 | B1 | * | 10/2004 | Cheng et al. | 455/510 |
| 6,862,268 | B2 | * | 3/2005 | Tripathi et al. | 370/329 |
| 6,904,033 | B1 | * | 6/2005 | Perras et al. | 370/338 |
| 6,963,582 | B1 | * | 11/2005 | Xu | 370/466 |
| 6,993,352 | B2 | * | 1/2006 | Lundby | 455/466 |

(Continued)

FOREIGN PATENT DOCUMENTS

CN       1422065 A    6/2003
WO    WO 03/001762 A2    1/2003

OTHER PUBLICATIONS

Anonymous, "3GPP2 Access Network Interfaces Interoperability Specification," (2001), pp. 173-193.

(Continued)

*Primary Examiner* — Ario Etienne
*Assistant Examiner* — Blake Rubin
(74) *Attorney, Agent, or Firm* — Wilmer Cutler Pickering Hale and Dorr LLP

(57) ABSTRACT

Systems and methods for establishing and operating data sessions between mobile subscriber units and packet data servers on a wireless communication network are presented. Some aspects described herein are directed to preventing the loss of an initial configuration request signal (e.g. under the LCP protocol) from a packet data server to a mobile subscriber prior to successful establishment of a radio air link to the mobile subscriber. Other aspects are directed to detecting the presence or absence of a radio air link to the mobile subscriber as a determinant of whether the packet data server is to send a configuration request signal to the mobile subscriber, or whether the packet data server should withhold the request signal until the air link is established. Some or all aspects presented are suitable for use in 3G or CDMA-2000 systems using the A10/A11 communication control protocol and the PPP data communication protocol.

17 Claims, 7 Drawing Sheets

(56) References Cited

U.S. PATENT DOCUMENTS

| | | | |
|---|---|---|---|
| 2002/0057658 A1* | 5/2002 | Lim | 370/331 |
| 2002/0057663 A1* | 5/2002 | Lim | 370/338 |
| 2003/0078050 A1* | 4/2003 | Carlborg et al. | 455/452 |
| 2003/0099213 A1 | 5/2003 | Lee et al. | |
| 2003/0119452 A1* | 6/2003 | Kim et al. | 455/69 |
| 2003/0157927 A1* | 8/2003 | Yi et al. | 455/411 |
| 2003/0158959 A1* | 8/2003 | Jayapalan et al. | 709/237 |
| 2003/0171117 A1 | 9/2003 | Wang et al. | |

OTHER PUBLICATIONS

First Office Action issued by the Chinese Patent Office for corresponding Chinese Patent Application No. 200480042815.0 (with English translation).

Fourth Amended Complaint, *UTSTARCOM, Inc.,* vs. *Starent Networks, Corp., et al.*, In the United States District Court for the Northern District of Illinois Eastern Division, Case 1:07-cv-02582, Document 207, Filed Sep. 25, 2008, pp. 1, 47, 69 and 91.

\* cited by examiner

REDUCED DATA SESSION ESTABLISHMENT TIME IN CDMA-2000 NETWORKS

TECHNICAL FIELD

The present application relates to wireless communication. More particularly, the present application relates to data session establishment and operation in CDMA-2000 networks.

BACKGROUND

Modern wireless communication networks have existed in some form for decades. Every so often, new technology and regulatory or commercial developments provide an impetus for progress in the wireless communication field. The earliest commercial ("first generation" or "1G") cellular systems used analog voice channels and digital controls, and had very limited data communication capabilities. These were replaced by "second generation" or "2G" systems that used digital radio channels for both voice and control. Recently, "third generation (3G)" communication systems, including CDMA-2000 systems, became available. CDMA is one common form of digital communication, and stands for Code Division Multiple Access. The term CDMA-2000 itself is a registered trademark of the Telecommunications Industry Association. CDMA-2000 combines multiple radio channel communication with advanced data packet transmission protocols to provide high-speed data services over existing networks.

Wireless telephone use has expanded significantly in recent years, with an accompanying increase in the number of subscribers per square mile and the number of subscribers simultaneously using the available bandwidth in a given area. As a result, modern wireless networks are divided into geographical zones, called cells (hence the term "cellular"), which allow a plurality of subscribers to share the services of a radio tower and a frequency within each cell. Accordingly, it is a goal of communication providers to increase the capacity and performance of the available cellular communication infrastructure. This patent application provides systems and methods that are directed to such improvements.

SUMMARY

One or more embodiments described herein provide systems and methods for reducing data session establishment time in 3G or CDMA-2000 wireless communication networks. By preventing or minimizing the time lost in establishing a successful over the air configuration negotiation, service providers and subscribers will enjoy increased network performance. Time and signal-based triggers and wait periods are defined to optimize the timing of the delivery of the configuration request signals from the packet data servers to the mobile subscribers for minimum session establishment time.

One embodiment is directed to a method for establishing a data communication session with a mobile subscriber in a wireless communication network, including steps of registering a data session with a packet data server; providing a wait time period during which the packet data server refrains from sending a configuration request to the mobile subscriber; and following the wait time, sending a configuration request signal to the subscriber to negotiate establishment of the data communication session.

Another embodiment is directed to a method for communicating with a mobile subscriber in a wireless communication network, including steps of registering a data session with a packet data server; providing a first wait time period during which the packet data server negotiates an initial configuration with the mobile subscriber, the first wait time period substantially defining a wait time between attempts to send an initial configuration request signal to the mobile subscriber; and once the initial configuration is negotiated, providing a second wait time period, different from the first wait time period, the second wait time period substantially defining a wait time following a data communication error event before the packet data server attempts to renegotiate the data session with the mobile subscriber.

Yet another embodiment is directed to a method for communicating with a mobile subscriber in a wireless communication network, including steps of registering a data session with a packet data server; negotiating a data communication session with the mobile subscriber; and buffering data packets in a buffer in a time period between said registering of the data session and said negotiating of the data communication session, the act of buffering said data packets preventing loss of data packets sent from the packet data server to the mobile subscriber prior to successful establishment of an air link to the mobile subscriber.

Another embodiment is directed to a method for establishing a data communication session with a mobile subscriber in a wireless communication network, including steps of registering a data session with a packet data server; waiting until the packet data server receives a signal indicating that a radio air link has been successfully established to the mobile subscriber; and following receipt of said signal indicating that the radio air link has been successfully established, sending a configuration request signal to the mobile subscriber.

Still another embodiment is directed to a method for establishing a data communication session with a mobile subscriber in a CDMA-2000 wireless communication network, the method including the steps of exchanging data session registration signals between a packet control function module and a data packet server module to register the data communication session according to a known communication control protocol; and preventing a premature transmission of a data session configuration request signal from the data packet server to the mobile subscriber by preemptively withholding the data session configuration request signal at the data packet server until a triggering event is received by the packet data server indicating that the data session configuration request signal is to be sent to the mobile subscriber.

In another embodiment, a system for wireless communication is provided, the system including a mobile subscriber; a packet data server; a communication network adapted for carrying control and data packets between the mobile subscriber and the packet data server; a radio air link portion of said communication network, the radio air link having an air link establishment delay time; and a processor on said packet data server that sends a configuration request signal over said radio air link responsive to a trigger signal indicating that said radio air link is ready to carry said configuration request signal to said mobile subscriber.

BRIEF DESCRIPTION OF THE DRAWINGS

For a fuller understanding of the present disclosure, reference is made to the following detailed description taken in conjunction with the accompanying drawings in which.

DETAILED DESCRIPTION

A hallmark of successful wireless communication is the ability to seamlessly "hand off" a mobile subscriber from one base station to another as the mobile subscriber physically moves, e.g. drives, from one cell to the other. Proper call handoff from one base station to another provides the subscriber with uninterrupted service during a call, and is done quickly and smoothly to avoid compromising the call quality. In data communications, this avoids dropped packets and provides increased data transfer speeds. In switching between base stations, calls need to be established in each base station that comes online to service the calls.

Two protocols are used in the setting up cellular calls on CDMA-2000 networks: the A11 protocol used for call establishment, and the A10 protocol that provides for data transport. Together, the A10/A11 protocols are known as the RP Interface, and are specified according to the 3G Partnership Project-2 (3GPP2), which maintains an Internet presence at www.3gpp2.org. Subscriber data exchanged over the A10 protocol is formatted using the point-to-point (PPP) protocol, which connects most computers to the Internet.

Figure 1:
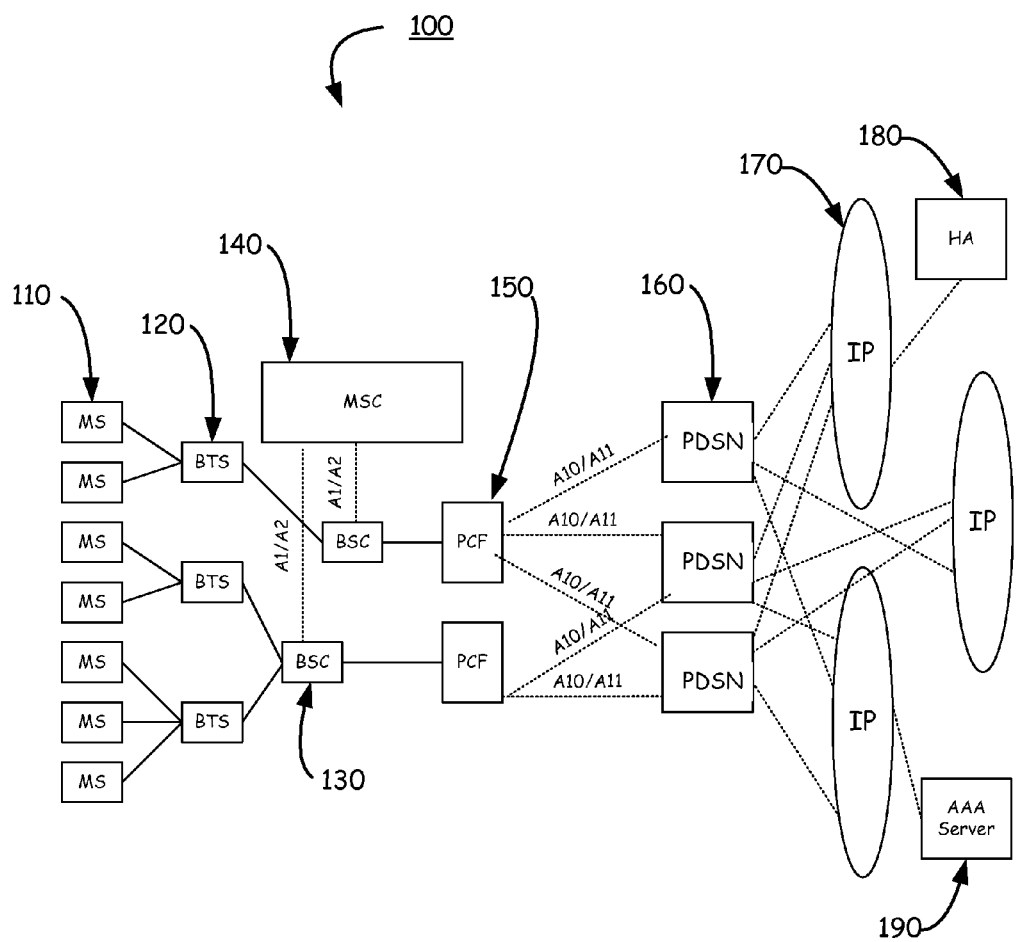
FIG. 1 schematically illustrates an exemplary CDMA-2000 wireless communication system.

Refer to FIG. 1, which illustrates a CDMA-2000 communication system 100 and components thereof. Mobile subscriber (MS, 110) is serviced by base station (BTS, 120) and base station controller (BSC, 130). The BSC 130 communicates with a mobile switching center (MSC, 140) in A1/A2 communication protocol. The system allows the subscriber to carry out a data communication session facilitated by a packet data server, also referred to herein as a packet data servicing node (PDSN, 160), over IP network 170. Packet control function (PCF, 150) is an entity that supplies A10/A11 communication between BSC 130 and PDSN 160. Home Agent (HA, 180) is used to keep subscriber-specific data and controls the interaction between subscribers and their home (institution) networks and foreign agents. Authentication, Authorization, and Accounting (AAA) Server 190 provides the system with knowledge of the subscriber's subscription and service details relating to access and billing.

To negotiate an IP data session to the point where data can be passed along the session, PCF 150 and PDSN 160 first signal one another according to a predetermined signaling scheme (A11) to register the data session. Following the PCF-PDSN registration transaction, PDSN 160 exchanges signals with MS 110 according to the Link Configuration Protocol (LCP). PPP provides the LCP for establishing, configuring and testing the data link connection. LCP is used to automatically negotiate the encapsulation format options between PDSN 160 and MS 110, handle varying limits on sizes of packets, detect a looped-back link and configuration errors, and terminate the link. Other optional facilities provided are authentication of the identity of a peer on the link, and determining when a link is functioning properly and when it is failing.

LCP packets are generally grouped into three types: 1) Link configuration packets, which are used to establish and configure a link (link configuration packets include Configure-Request, Configure-Ack, Configure-Nak, and Configure-Reject packets); 2) Link termination packets, which are used to terminate a link (link termination packets include Terminate-Request and Terminate-Ack packets); and 3) Link maintenance packets, which are used to manage and debug a link (these include Code-Reject, Protocol-Reject, Echo-Request, Echo-Reply, and Discard-Request packets). LCP packets are encapsulated in the PPP Information field (one packet per field), and the PPP Protocol field indicates the LCP type within the PPP Information Field using the designation hex: c021.

Figure 2:
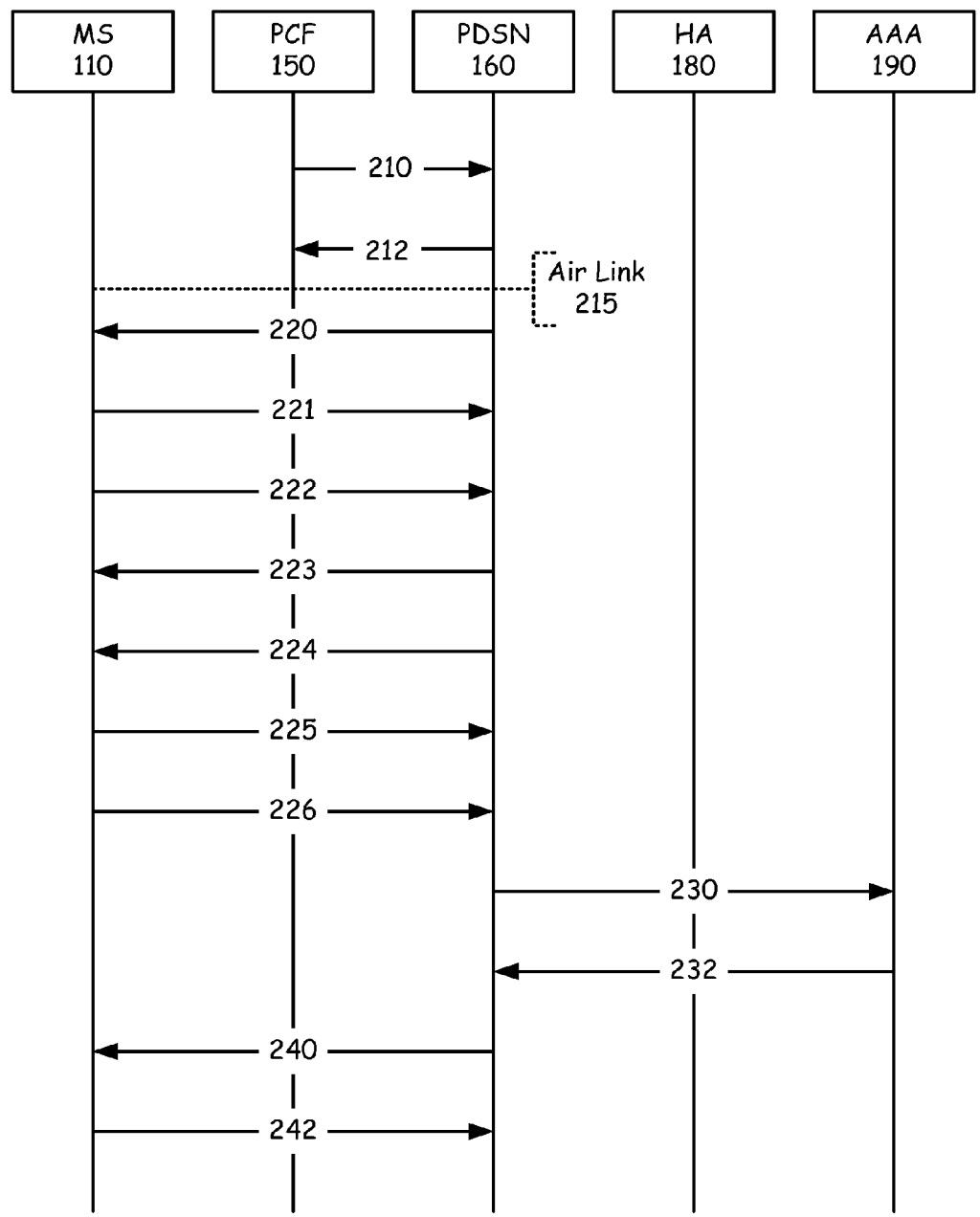
FIG. 2 illustrates a process for establishing a CDMA-2000 data session.

FIG. 2 illustrates a sequence of signals exchanged between an MS 110, PCF 150, and PDSN 160 to establish a data session. MS 110 initiates a call to the network, through its base station BTS 120 and base station controller BSC 130. PCF 150 receives a notification of the request and contacts PDSN 160 with an A11 "registration request" signal 210, requesting a data session to be established. PDSN 160 responds with an A11 "registration reply" signal 212 to accept or reject the data session. When PCF 150 receives a favorable (acceptance) registration reply from PDSN 160, PCF 150 acts to establish a radio air link 215 with MS 110, allowing MS 110 to communicate with PDSN 160.

The act of establishing the radio air link is a common cause for delays in establishing data sessions in 3G wireless systems. Because the network connecting MS 110, PCF 150, and PDSN 160 is geographically distributed, it takes a finite time for signals to travel between the components of the network. Notably, it can take an appreciable time for radio air link 215 to be established between PCF 150 and MS 110. In general, the time to establish an air link can vary, depending on the service vendor and network conditions, typically being between 50 milliseconds and a full second.

If the air link is not established when the PDSN 160 commences sending its next request, an LCP configuration request 220 to MS 110 to establish the data session, the LCP configuration request 220 is lost, and PDSN 160 must retransmit its configuration request 220. Under the A11 protocol, there is no mechanism that prevents PDSN 160 from sending LCP configuration request 220 prematurely, before air link 215 to MS 110 is established. This can occur because the A11 protocol does not include 3-way handshaking to ensure that all the components involved in establishing the data session are properly considered and synchronized. Therefore, a race condition can be created, where the A11 call establishment procedure allows PDSN 160 to send its initial LCP configure request 220 before the air link is properly established to MS 110. This condition results in a time-out in the PDSN PPP state machine, and the time-out results in retransmission of the lost LCP request 220 after some predetermined period of time. Under current protocols, this time-out period of time can be about 3 seconds, or even up to 6 seconds in duration.

The missed initial LCP configuration request problem described above can be exacerbated when various functions of PCF 150 are carried out at different locations on separate hardware. For example, a first piece of hardware and functionality may be dedicated to processing the PCF-PDSN registration request-response messages, while a second piece of hardware and functionality may be dedicated to processing the data packet flow between MS 110 and PDSN 160. Yet another piece of hardware might be responsible for making and maintaining the physical radio air link between MS 110 and PCF 150. Note that communication between MS 110 and PDSN 160 normally passes through PCF 150.

The race condition, and/or the time-out condition occur often enough in 3G wireless systems as to cause a noticeable degradation in system performance from the point of view of an affected subscriber. Wireless vendors have failed to appreciate or remedy the above problem, perhaps because they maintain a traditional voice service (time domain) perspective that is generally insensitive to a loss of a small leading portion of a signal (e.g., half a second of a voice signal). However, in the context of digital data communication, communication is usually viewed in the packet domain, and the same losses are not acceptable. Therefore, one issue recognized and treated in the present disclosure is that of the relative timing of the signals in the LCP sequence on establishing a data session and corresponding air link in a CDMA-2000 network.

Referring again to the process depicted in FIG. 2, the PPP communication between the MS 110 and PDSN 160 is symmetrical, and takes place between a PPP "stack" in each of MS 110 and PDSN 160. PCF 150 is a conduit for the PPP messaging between MS 110 and PDSN 160. Therefore, a set of an LCP configuration request 220 and an LCP configuration response 221 messages is initiated by PDSN 160, and another set of an LCP configuration request 222 and an LCP configuration response 223 messages is initiated by MS 110. Further LCP configuration requests 224, 226 and LCP configuration response 225 messages are exchanged between MS 110 and PDSN 160 as a way of negotiating the details and form of the data session.

Following a successful LCP configuration sequence, signals 230, 232 are exchanged between PDSN 160 and any or both of the home agent 180 and AAA server 190 to determine subscriber use, authorization, and billing information. Data session setup also normally involves password authorization protocol (Ack) messages 240 and IP control protocol messages 242 to determine subscriber access and IP address information for MS 110. Following successful establishment of the data session, MS 110 can exchange user-level data in the form of digitized packets encapsulated in the A10-PPP protocols. It can be appreciated that user-level (e.g. Web browsing) data transactions must wait until several control and session establishment steps are successfully complete. Therefore, delays in data session establishment, which can occur because of the LCP configuration race condition, translate into delays getting data to and from MS 110.

One way of treating the above-mentioned race condition is to purposely delay the sending of the first LCP configuration request message 220 by PDSN 160. This can be accomplished by building in a set or programmable time delay (e.g., 100 milliseconds) that would provide PCF 150 with sufficient time to establish air link 215 with MS 110 before attempting to deliver initial LCP configuration request message 220. In this way, air link 215 can be made ready, and initial LCP configuration request message 220 is not lost, avoiding the (3 second) time-out condition. Thus, by waiting 100 milliseconds in this example to send LCP configuration request message 220, the system will establish a successful data session almost 3 seconds sooner than if the initial LCP configuration request message 220 was transmitted by PDSN 160 without waiting.

Figure 3:
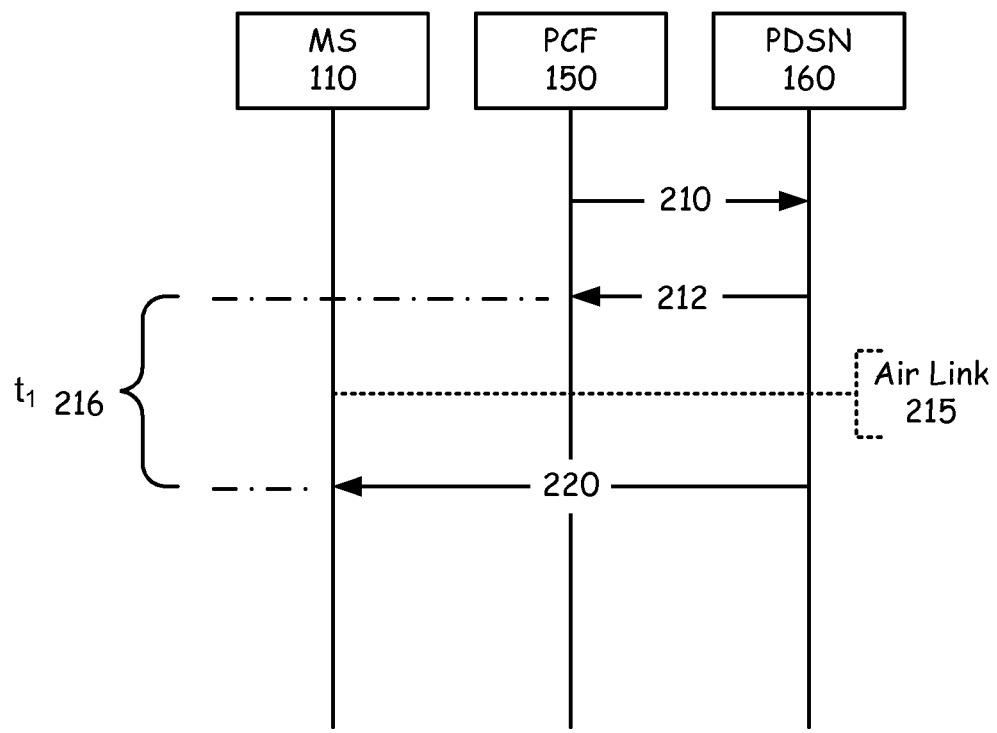
FIG. 3 illustrates a portion of a process for establishing a CDMA-2000 data session according to a first embodiment described herein.

Refer to FIG. 3, which illustrates a portion of the data session establishment process shown in FIG. 2. PCF 150 and PDSN 160 exchange the earlier-mentioned A11 registration request 210 and reply 212. Then, before allowing PDSN 160 to send out the initial LCP configuration request 220, PDSN 160 waits for a period of time $t_1$ 216 to allow air link 215 to be established. During the wait time period, PDSN 160 refrains from sending initial LCP configuration request 220. The wait time $t_1$ 216 may be a pre-determined fixed time, or a time determined on the basis of some network condition. $t_1$ 216 could be stored or calculated within PCF 150 and/or PDSN 160. It should be noted that, in this embodiment, $t_1$ 216 is not necessarily decided by the actual duration of time it takes to establish a particular air link, but rather by an appropriate duration that would reasonably be expected to allow for an air link 215 to be established in most or all instances in a given network configuration. Wait time $t_1$ 216 is provided to PDSN 160 or stored therein.

The set or programmable wait time $t_1$ 216 can be made to depend on factors such as IP addresses of the communicating components, their physical or network separation, environmental, network conditions, etc., and the wait time can be stored in a look-up table or calculated dynamically using some algorithm. To achieve further performance gains, this embodiment can be programmed so that if any data packets are received by PDSN 160 from the MS 110/PCF 150 client, then PDSN 160 should immediately proceed with the transmission of messages to the MS 110/PCF 150 client, as it is established that air link 215 is up and operational. Therefore, there is no need for an initial wait period if it is clear that an air link has already been set up.

Wait time $t_1$ 216 can also be determined by PDSN 160 "pinging" (sending a test signal to) PCF 150 and calculating the network propagation time from the time it takes to get a response to its ping. Those skilled in the art will appreciate various methods for determining network conditions and signal propagation times for use in the wait time determination. Still another factor that can be used in determining the appropriate wait time would be from knowledge of MS 110's radio access technology, which can be signaled using the 3GPP2's "service option" in the A11 registration request message 210.

Alternatively, two different LCP retransmit wait times may be defined depending on the status of the data session. A first retransmit wait time $t_1$ for resending the initial LCP configure request 220 if a first attempt to do so is unsuccessful, and a second retransmit wait time $t_2$ before renegotiating a session that was interrupted by an error in the ordinary course of communication.

Figure 4:
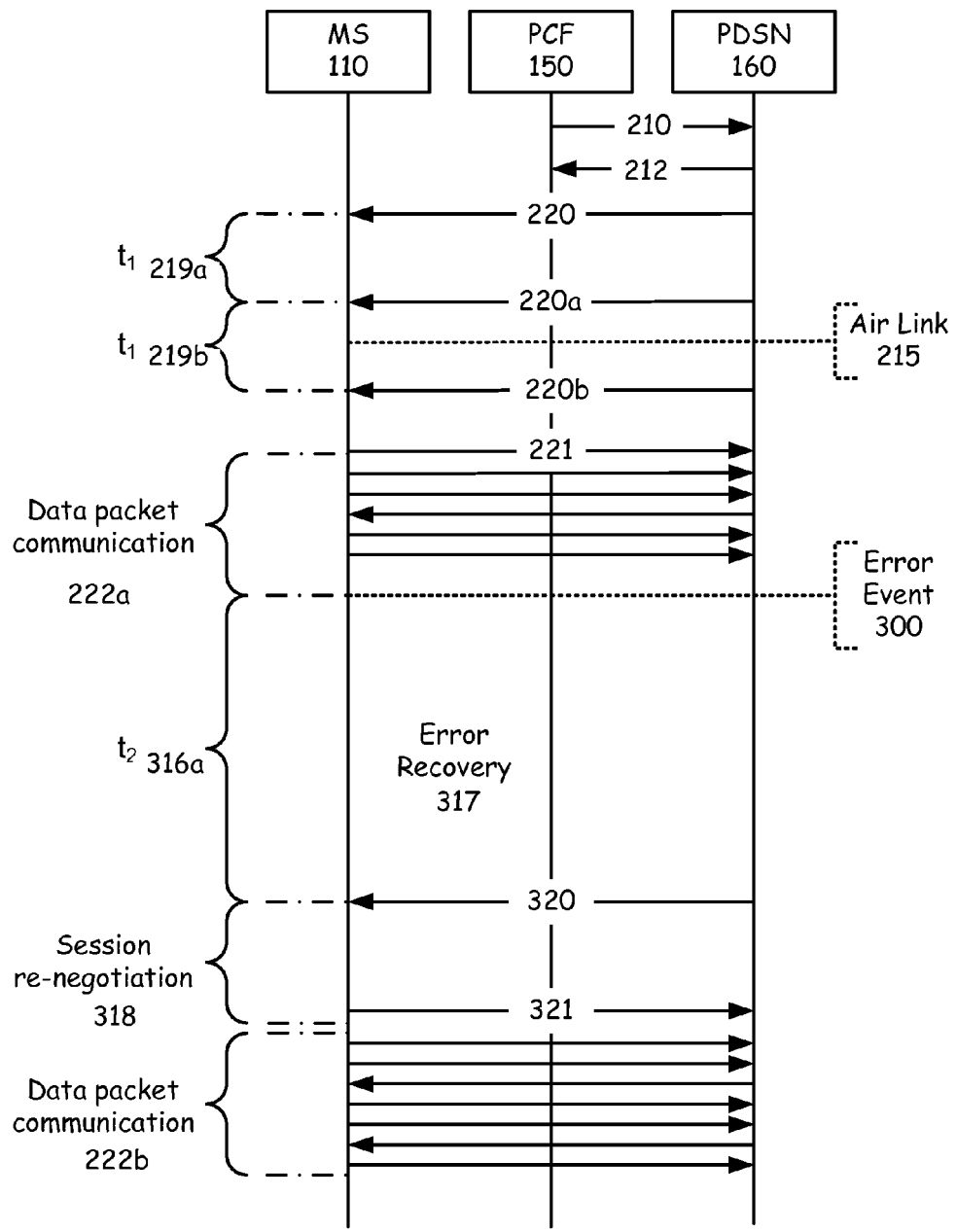
FIG. 4 illustrates a process for communicating in a CDMA-2000 data session according to a second embodiment described herein.

Refer to FIG. 4, which illustrates establishment of a data session, data packet communication 222a, a communication error event 300, error recovery 317, and subsequent renegotiation of the failed session 318. PCF 150 and PDSN 160 exchange the earlier-mentioned A11 registration request 210 and reply 212. The initial LCP configuration request 220 from PDSN 160 is sent before air link 215 is established, and is lost. PDSN 160 then waits a short (e.g. 10-100 milliseconds) wait time. $t_1$ 219a and retransmits an LCP configuration request 220a. As air link 215 is not yet established, PDSN 160 waits yet another time duration $t_1$ 219b and retransmits yet another LCP configuration request 220b. PDSN 160 repeats its attempts to deliver the LCP configuration request until an air link 215 is established and its attempts succeed or another abort event occurs. In the example of FIG. 4, an air link 215 is established after two unsuccessful attempts, and LCP configuration request 220b is successfully delivered. This phase of the session took approximately two $t_1$ periods (e.g., 200 milliseconds) instead of the long (e.g., 3 second) time-out duration of presently used systems. Any redundant LCP request messages sent following successful session initiation can then be ignored by the PPP stacks. Once air link 215 and the data session are operationally negotiated, data packets can be exchanged as is commonly done in CDMA-2000 systems.

Now assume an error event 300 occurs in the normal course of communication. Unlike the missed initial (session establishment) LCP configuration packets, dropped data packets in the course of data session communication usually indicate a substantive fault condition that takes a finite reset time (time-out) from which to recover. Therefore, a longer wait time $t_2$ 316a (e.g. 1-3 seconds) is used before attempting to renegotiate the session to allow for recovery from the error condition. PDSN 160 waits the period $t_2$ 316a and sends a new LCP configuration request 320 and receives a LCP configuration reply 321 in the same or similar way that the initial LCP configuration exchange 220-221 was made.

Figure 5:
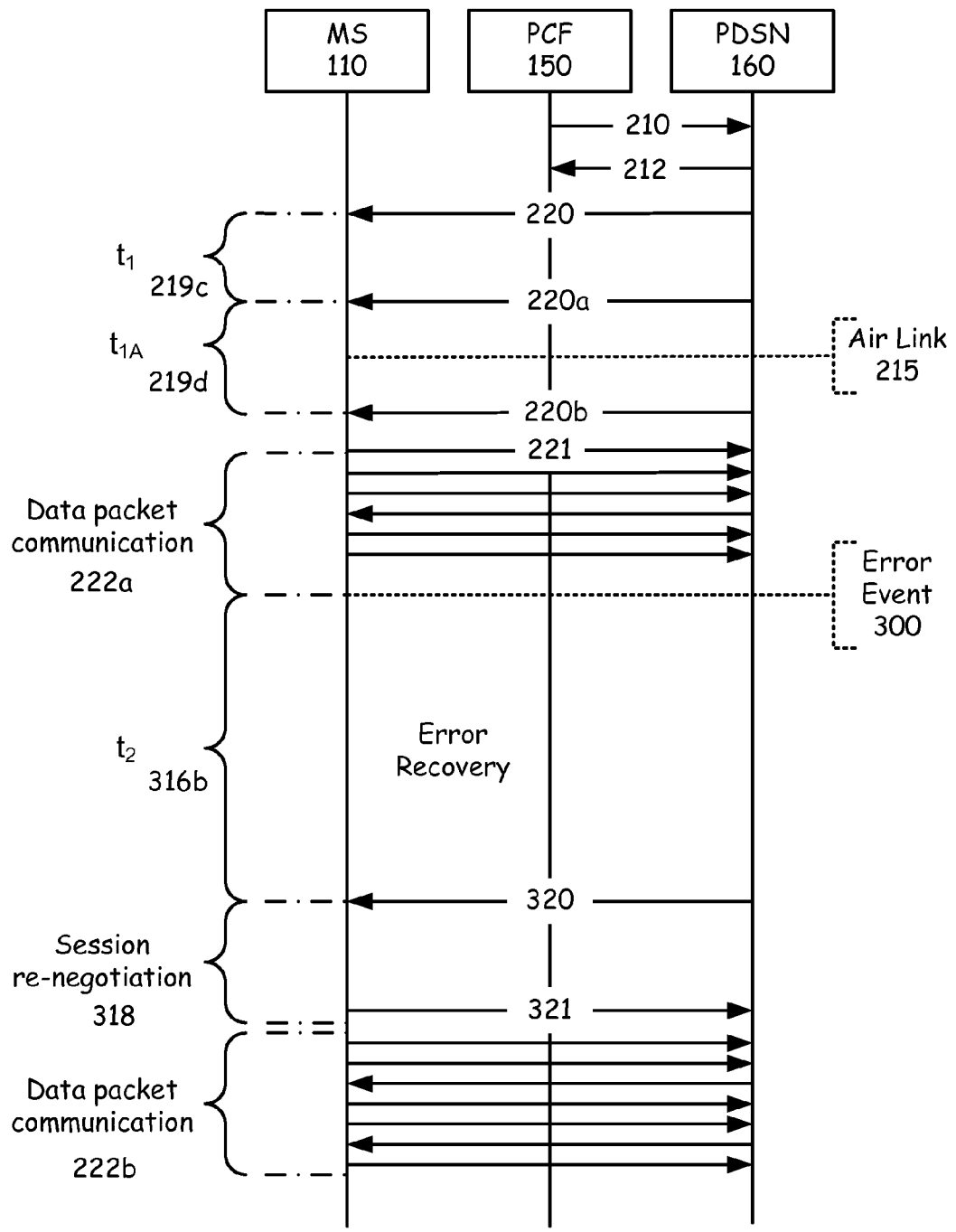
FIG. 5 illustrates a process similar to that of FIG. 4, with two different short wait times being used.

It should be appreciated that the two short wait times $t_1$ (219a and 219b) of FIG. 4 are not necessarily identical. FIG. 5 illustrates an embodiment similar to that of FIG. 4, except that the two short wait times (indicated as $t_1$ 219c and $t_{1a}$ 219d in FIG. 5) are not of equal duration. In this embodiment, each of wait times $t_1$ 219c, $t_{1a}$ 219d and $t_2$ 316b are of a different duration.

Another embodiment provides a buffer within PCF 150 to prevent loss of initial LCP configuration request packet 220 or any other early data packets that precede establishment of air link 215. Here any data packets received from PDSN 160 are held in a queue/buffer while PCF 150 establishes the required air link with the appropriate MS 110. In some specific situations, PCF 150 may hold the data packets in the buffer until the initial A11 LCP registration-request and registration-reply sequence is complete.

Figure 6:
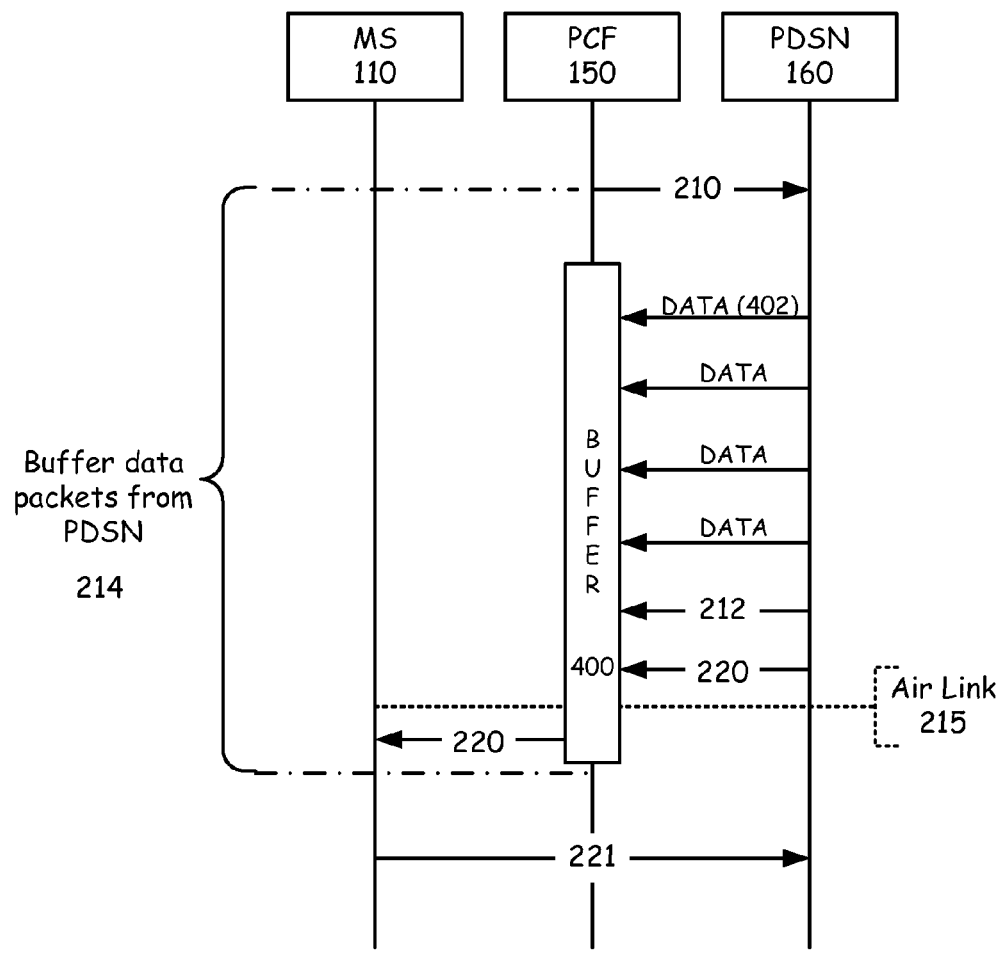
FIG. 6 illustrates a portion of a process for establishing a CDMA-2000 data session according to a third embodiment described herein.

Refer to FIG. 6, which illustrates a data session setup process where PCF 150 has a buffer 400 that stores data packets 402 sent by PDSN 160 as indicated in time period 214 while PCF 150 establishes radio air link 215 with MS 110. Therefore, when air link 215 is delayed, data (including LCP configuration request 220) from PDSN 160 are not lost. The data can be delivered to MS 110 following establishment of air link 215.

In the above examples, a time-based "trigger" was used to cause PDSN 160 to send its initial LCP configuration request signal 220 to MS 110/PCF 150. It is also possible to use an event-triggered mode (e.g. waiting for a "Go"-signal) to control sending the initial LCP configuration request signal 220 to MS 110/PCF 150.

One such embodiment uses optional "Air Link Start" information (e.g., in the A11 registration request message 210 from PCF 150 to PDSN 160) to trigger sending the initial LCP configuration request packet 220 so request 220 will not be sent prematurely and be lost. The Air Link Start information tells PDSN 160 that an air link has actually been established. In some cases, it can be inferred from the absence of the Air Link Start message that an air link does not yet exist, and that sending the initial LCP configuration request 220 would probably result in loss of the request 220 and delays in establishing the data session. Therefore, it is possible to introduce a wait time (e.g., 100 milliseconds) when PDSN 160 does not receive an Air Link Start signal with the A11 registration request message 210 to allow for the air link to be established. Note that the Air Link Start message can also be delivered to PDSN 160 subsequent to the A11 registration request message 210, for example, in a subsequent A11 request message sent by PCF 150 to PDSN 160.

In the event that PDSN 160 does not receive an "Air Link Start" message 700 after waiting same predetermined time, PDSN 160 may nonetheless send LCP configuration request 220. Therefore, various embodiments provided herein are compatible with one another and may be used in combination.

Figure 7:
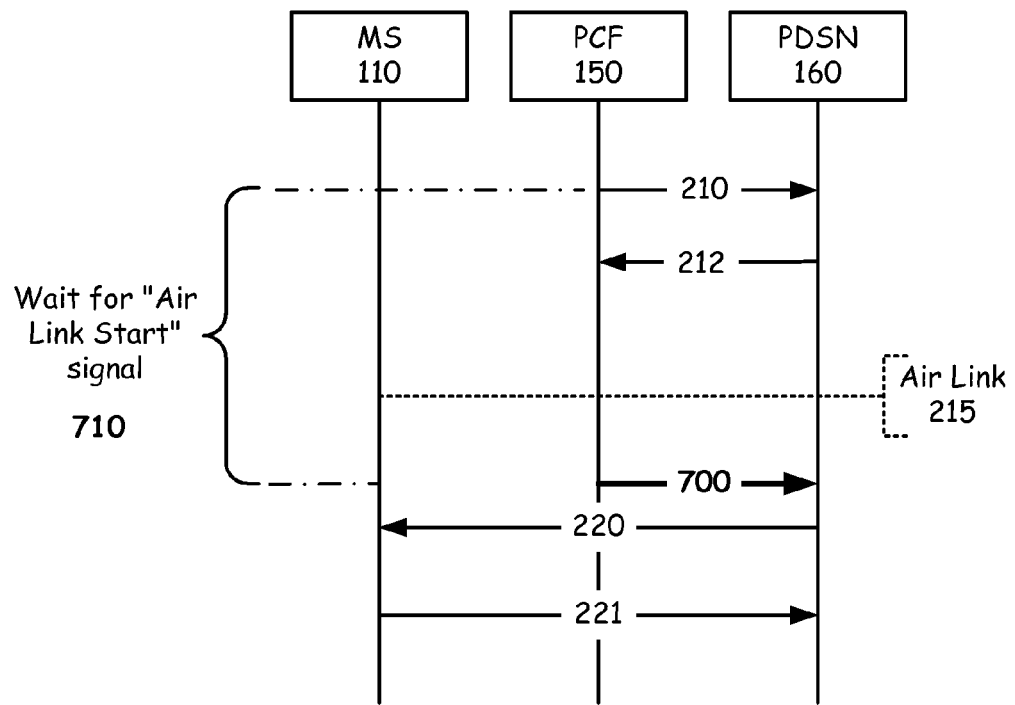
FIG. 7 illustrates a portion of a process for establishing a CDMA-2000 data session according to a fourth embodiment described herein.

Refer to FIG. 7, which illustrates a process for establishing a data session, including a step of sending Air Link Start signal 700 from PCF 150 to PDSN 160 only after air link 215 is established. The wait time for "air link start" signal 710 denotes the time between the sending of registration request 210 and the sending of air link start signal 700 by PCF 150. Upon receiving Air Link Start signal 700, PDSN 160 sends its initial LCP configuration request 220 as discussed previously. This avoids sending the initial LCP configuration request 220 too early, which might result in a delay in session establishment due to the time-out described above.

It should be appreciated that the systems and concepts described herein apply not only to data communication, but may also apply to other types of communication carried over systems sharing enough characteristics with those described above in the context of CDMA-2000 and 3G systems. In some respects, this includes the Mobile IP-based wireless systems. Additionally, numerous auxiliary communication and telephony functions and features may be included in the systems or methods described herein.

Upon review of the present description and embodiments, those skilled in the art will understand that modifications and equivalent substitutions may be performed in carrying out the invention without departing from the essence of the invention. Thus, the invention is not meant to be limited by the embodiments described explicitly above; rather it should be construed by the scope of the claims that follow.

What is claimed is:

1. A method for establishing a data communication session with a mobile subscriber in a wireless communication network, comprising:
   receiving a registration request at a packet data server to register a data communication session between the packet data server and the mobile subscriber prior to a radio air link being established with the mobile subscriber;
   sending a reply signal from the packet data server to trigger the establishment of a radio air link between the base station and the mobile subscriber to allow communication between the packet data server and the mobile subscriber;
   waiting a time period after the registration request and the reply to allow establishment of the radio air link before sending a link configuration request to the mobile subscriber, wherein the link configuration request is used to set up a data link connection between the mobile subscriber and the packet data server; and
   establishing a data communication session between the mobile subscriber and the packet data server using the data link connection.

2. The method of claim 1, further comprising calculating a dynamic duration for the set time period based on network conditions.

3. The method of claim 1, wherein waiting the time period comprises providing a fixed wait time period having a duration between 10 milliseconds and 1 second.

4. The method of claim 1, wherein waiting the time period comprises providing a fixed wait time period having a duration of approximately 100 milliseconds.

5. The method of claim 1, wherein registering the data session comprises registering the data session according to an A11 protocol compatible with a Point-to-Point Protocol (PPP) communication network.

6. The method of claim 1, wherein sending the link configuration request signal comprises sending a Point-to-Point Protocol (PPP) based signal.

7. A method for communicating with a mobile subscriber in a wireless communication network, comprising:
- receiving a request at a packet data server to register a data session between a mobile subscriber and the packet data server prior to a radio air link being established with the mobile subscriber;
- sending a signal from the packet data server to trigger the establishment of a radio air link between the base station and the mobile subscriber to allow communication between the packet data server and the mobile subscriber;
- sending an initial link configuration signal for the mobile subscriber from the packet data server, wherein a link configuration signal is used to establish a data link connection between the mobile subscriber and the packet data server; and
- waiting a first set time period from sending the initial link configuration request signal for the mobile subscriber before sending a second initial link configuration request signal, wherein the first set time period provides additional time for establishment of the radio air link.

8. The method of claim 7, further comprising providing a second wait time period triggered by a data communication error event before sending a link configuration request signal to the mobile subscriber.

9. The method of claim 7, further comprising repeatedly waiting a time equal to the first wait time period until an air link to the mobile subscriber is successfully established.

10. The method of claim 8, wherein the link configuration signal is a Point-to-Point Protocol (PPP) based communication protocol which upon configuration establishes a PPP connection between the mobile subscriber and the packet data server.

11. The method of claim 7, wherein waiting the first set time period comprises waiting a first time period having a duration between 10 milliseconds and 1 second.

12. The method of claim 7, wherein the radio air link allows the establishment of a data communication session.

13. A system for wireless communication, comprising:
- a packet data server;
- a communication network adapted for carrying control and data packets between a mobile subscriber and the packet data server;
- a radio air link portion of said communication network, the radio air link having associated therewith an air link establishment delay time; and
- said packet data server including a processor that triggers the establishment of the radio air link and attempts sending a link configuration request signal over said communication network responsive to an indication that said radio air link is ready to carry said link configuration request signal to said mobile subscriber to establish a first Point-to-Point Protocol (PPP) connection.

14. The system of claim 13, wherein the indication comprises a time-based signal indicating that a wait time exceeding the air link establishment delay time has elapsed.

15. The system of claim 13, wherein the indication comprises an event-based signal indicating that the air link has been successfully established to the mobile subscriber.

16. The method of claim 1, further comprising buffering data packets prior to the successful establishment of a radio air link to the mobile subscriber.

17. The method of claim 1, wherein the time period is determined from the packet data server pinging a node and determining a network propagation time.

* * * * *